United States Patent [19]

Johnson

[11] 4,075,284

[45] * Feb. 21, 1978

[54] PROCESS FOR THE REMOVAL OF SULFUR OXIDES BY THE USE OF ACTIVATED ALUMINA

[75] Inventor: Arthur F. Johnson, Franklin Lakes, N.J.

[73] Assignee: R.C.M. Corporation, Los Angeles, Calif.

[*] Notice: The portion of the term of this patent subsequent to May 11, 1993, has been disclaimed.

[21] Appl. No.: 653,260

[22] Filed: Jan. 28, 1976

Related U.S. Application Data

[62] Division of Ser. No. 483,129, June 26, 1974, Pat. No. 3,955,969.

[51] Int. Cl.$^2$ .................. C01B 17/00; B01J 8/00; C01C 3/00; C01B 17/48
[52] U.S. Cl. .................. 423/244; 423/237; 423/545; 423/539
[58] Field of Search ............ 423/242, 244, 237, 239, 423/545, 539

[56] References Cited

U.S. PATENT DOCUMENTS

| | | | |
|---|---|---|---|
| 3,492,083 | 1/1970 | Lowicki et al. | 423/244 |
| 3,523,407 | 8/1970 | Humbert | 423/242 |
| 3,882,222 | 5/1975 | Deschamps et al. | 423/242 |
| 3,886,261 | 5/1975 | Libutti | 423/244 |

FOREIGN PATENT DOCUMENTS

| | | | |
|---|---|---|---|
| 2,170 of | 1897 | United Kingdom | 423/237 |

*Primary Examiner*—O. R. Vertiz
*Assistant Examiner*—Gregory A. Heller
*Attorney, Agent, or Firm*—James J. Burke

[57] ABSTRACT

Production of an activated type alumina from aluminum dross by digestion with water, preferably pressurized. The peculiar properties associated with trace compounds present in the product make it useful for the recovery of noxious effluents from furnacing processes, including those burning fossil fuels and those used for smelting both aluminum and steel, wherein the alumina beneficially incorporates in the metallurgical flux.

14 Claims, 4 Drawing Figures

PROCESS FOR THE REMOVAL OF SULFUR OXIDES BY THE USE OF ACTIVATED ALUMINA

This application is a division of application Ser. No. 483,129, filed June 26, 1974, now U.S. Pat. No. 3,955,969 issued May 11, 1976. Other divisions of said patent are Ser. No. 653,263 and 653,265, both filed Jan. 28, 1976 and now respectively U.S. Pat. Nos. 4,050,925 and 4,050,999, both issued on Sept. 27, 1977.

BACKGROUND OF THE INVENTION

This invention relates in general to a method of producing an activated type of alumina from aluminum dross. More particularly, it relates to utilizing the peculiar properties of the activated alumina, which results from the method used in recovering it from dross that is skimmed or otherwise separated from molten aluminum or aluminum alloys. This dross may float on the surface of molten aluminum or sink as a sludge therein and thus be removed by skimming, filtering through screens or filtering through granular filter beds.

Aluminum dross usually contains 50 to 80% metallic aluminum entrained in aluminum oxide, and much smaller quantities of aluminum nitride, aluminum carbide, alkali and alkaline earth oxides and halides, which are used as fluxes on the molten aluminum surface to decrease oxidation during melting or holding in a molten condition prior to casting. The use of dross or aluminous skimmings for feed to Hall cells for the electrolytic reduction of aluminum is an old as the Hallprocess. However, the nitrides and carbides are deleterious to Hall cell operation, because they segregate from the cryolite bath or flux and tend to accumulate on the carbon cathode. The nitrides in particular act as an electrical insulation layer on the carbon cathode, and make current densities uneven, so production of aluminum suffers.

Therefore, prior workers have concentrated principally on recovering the metallic aluminum content of dross while letting the aluminum oxide content of the dross go to waste. U.S. Pat. No. 3,770,424 can be considered typical. Greater amounts of metallic aluminum may be recovered from the dross if it is fluxed with ample amounts of chlorine or other halide fluxes, as illustrated in the very early U.S. Pat. Nos. 1,180,435 and 2,768,075, and, more recently, in U.S. Pat. Nos. 3,676,105, 3,751,243 and 3,694,190. While such processes tend to reduce the amounts of carbides and nitrides which contaminate the alumina, they increase the total impurities in the alumina by amounts of halide fluxes entrained in the alumina, so such alumina is unsuitable for making primary aluminum in Hall cells.

Where dross is not contaminated with chloride fluxes, as when dross is recovered by skimming crucibles of molten aluminum in the potrooms, the alumina as well as entrained metal in the dross may be recovered by steam treatment, as disclosed in U.S. Pat. No. 3,660,076. The steam decomposes the nitrides and carbides, so the recovered alumina and entrained aluminum are suitable for adding back to the reduction cells.

It has long been known that alumina is activated form would sorb various gases such as sulfurous gases, but means have not been available to remove such sulfurous components completely enough, and recover them as a byproduct, in an economic fashion. Likewise, aluminous materials have been used as fluxes in steel manufacture, but results have not been uniformly good enough for the steel industry to adopt alumina as a substitute for fluorspar in routine commercial operations.

OBJECTS OF THE INVENTION

It is therefore a general object of the present invention to provide an improved method of producing activated alumina from dross.

Another object of the present invention is to provide a method of recovering aluminum and activated alumina from dross.

Still another object of the present invention is to provide methods of using activated alumina recovered from dross.

A further object of the present invention is to provide a method of scrubbing sulfurous stack gases with activated alumina recovered from dross.

Yet another object of the present invention is to provide a method of fluxing steel refining baths with activated alumina recovered from dross.

A still further object of the present invention is to provide a method of improving Hall cell operation with activated alumina recovered from dross.

Various other objects and advantages of the invention will become clear from the following description of embodiments thereof, and the novel features will be particularly pointed out in connection with the appended claims.

THE DRAWINGS

Reference will hereinafter be made to the accompanying drawings, wherein.

SUMMARY OF THE INVENTION

The present invention is based, at least in part, on the discovery that aluminum dross can be rendered substantially free of deleterious nitrides and carbides by pressure digestion with hot water.

When the aluminum content of the dross is high, i.e. 20–80%, a mixture of halide fluxes, generally NaCl and KCl, is conventionally added to aluminum in a rotary or reverberatory furnace over the layer of aluminum. This overlying flux layer protects the molten aluminum from oxidation by the rapidly circulating furnace gases. When dross is added to this furnace it yields most of its metallic aluminum content to the aluminum layer and its alumina content to the halide flux layer. Mixing assists in getting a good separation. From time to time aluminum is tapped from the furnace and cast into various forms; and from time to time the halide-alumina flux, averaging 5-8% aluminum, is drawn off and quenched in water, which is preferably preheated. In accordance with the present invention, the mixture is then classified to remove at least some metallic aluminum particles, and is then pumped into a digestor and digested with water at 70° to 350° F., but preferably at temperatues above boiling, i.e. 250°-350° F. at 15-40 psi. This results in the aluminum carbides and nitrides being decomposed to alumina, and gases, principally ammonia and methane, which are bled off. Most remaining aluminum particles are easily separated from the digested alumina, which is then separated from the salt solution of soluble halide fluxes and dried or calcined to form activated alumina. The halide fluxes crystallizing out of the cooled, concentrated solutions are dried and fed back to the furnace to form the molten flux layer. This process is shown in simplified form in FIG. 1.

Figure 2:
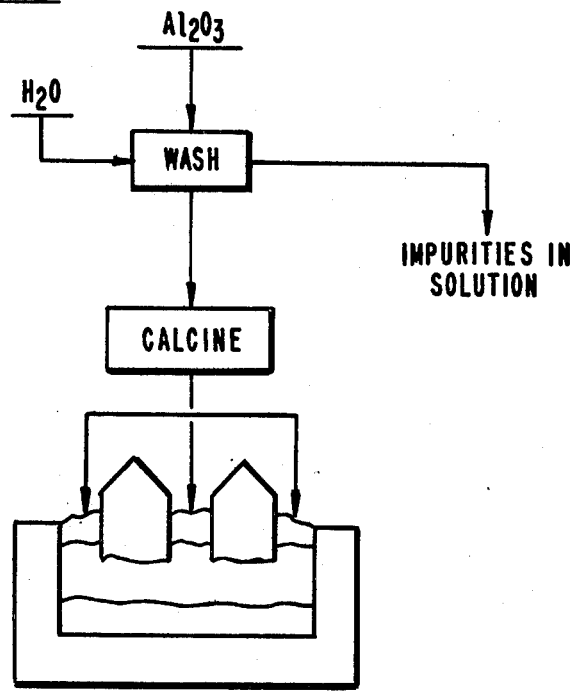
FIG. 2 is a simplified, schematic flow sheet or flow diagram illustrating use of activated alumina recovered from dross in Hall cell operation.

Activated alumina produced by this process may still contain fractions of a percent of aluminum nitride or carbide, and minor percentages of chlorides, depending on the temperature and length of time of digestion and the degree of washing of the alumina to free it of dissolved flux salts before it is dried. When the activated alumina is to be used to sorb fluorides from Hall cells and supply alumina needed to Hall cells in an aluminum reduction plant, it is preferably cleaned of such chloride impurities much more thoroughly than when the activated alumina is to be used for sorbing sulfurous gases or other purposes. As shown in FIG. 2, the alumina is subjected to a further washing to reduce impurities prior to calcining. When aluminum nitrides and carbides are present in deleterious amounts, it has been found that up to 5% sodium aluminate in the recirculating solution assists decomposition thereof by hydrolysis. As the alumina is fed to the Hall cell for recovery of its aluminum content, the activated alumina scrubs the fluorine gases generated in the Hall cell. This may be done by spreading the activated alumina on top of the cell-grade alumina which normally covers the cryolite crust of a Hall cell. As fluorides are evolved through the crust, they pass successively through the two layers. The activated alumina has a sorptive capacity for fluoride gas that is 3 to 10 times greater than cell-grade alumina, and so removes a substantial amount of these gases. Optionally, a fan can be provided under the hood to increase contact of the gases with the activated alumina, further reducing fluoride content of the former.

Alternatively, the same function can be carried out by the activated alumina in a separate scrubber or reactor. In this case the alumina should be +200 mesh or coarser to minimize dust losses. The reactor is located within or adjacent to the hood on the Hall cell, and holds the activated alumina in either a fluidized bed or dispersed-phase suspension, with the fluoride-bearing gases passing therethrough. The reactor includes means for recovering adsorbed alumina and other dust, which is periodically recovered and fed to the Hall cell. Such means could be a filter cloth or a reactor design of the cyclone type.

Figure 3:
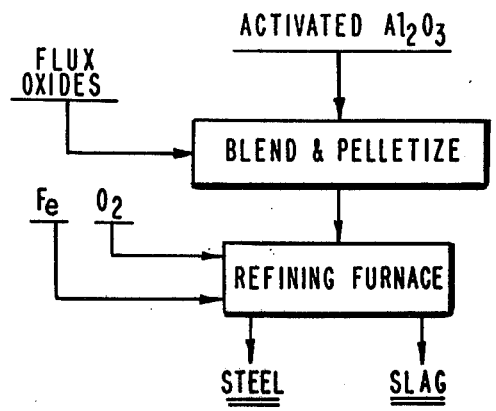
FIG. 3 is a simplified, schematic flow sheet or flow diagram illustrating use of activated alumina recovered from dross in steel refining.

As shown in FIG. 3, the activated alumina of the invention is advantageously employed with other fluxes in steel refining. When the activated alumina is used in fluxing steel, it tends to sorb the noxious gases emanating from the steelmaking process, including both fluorides and chlorides, and it incorporates these with phosphorous as the mineral apatite, wherein fluorine, chlorine, sulfur, carbon dioxide and phosphorous itself may be termed "mineralizers", as is well known in the formation of volcanic rocks. Apparently, prior workers have not taken cognizance of the catalytic ability of activated alumina containing small amounts of chlorides or fluorides to combine with phosphorous to form an insoluble precipitate of apatite or talc-apatite, the latter containing both sulfur and phosphorous. At the same time the alumina content of the activated alumina reduces the melting point of the required high-lime slag and exothermically heats it, insoluble dicalcium silicate is not precipitated to rob the molten slag of its effective alkalinity necessary for the removal of both phosphorous and sulfur from the steel bath.

Apart from the foregoing, the activated alumina produced by this process is beneficially employed in sorbing fluorides and chlorides from steel smelting furnaces, and supplying alumina and some metallic aluminum particles to the slag flux used therein to remove sulfur and phosphorus from the molten steel bath without excessive loss of iron as iron oxides to the slag. As is well known, iron oxides are reduced into the metal by aluminum.

Figure 4:
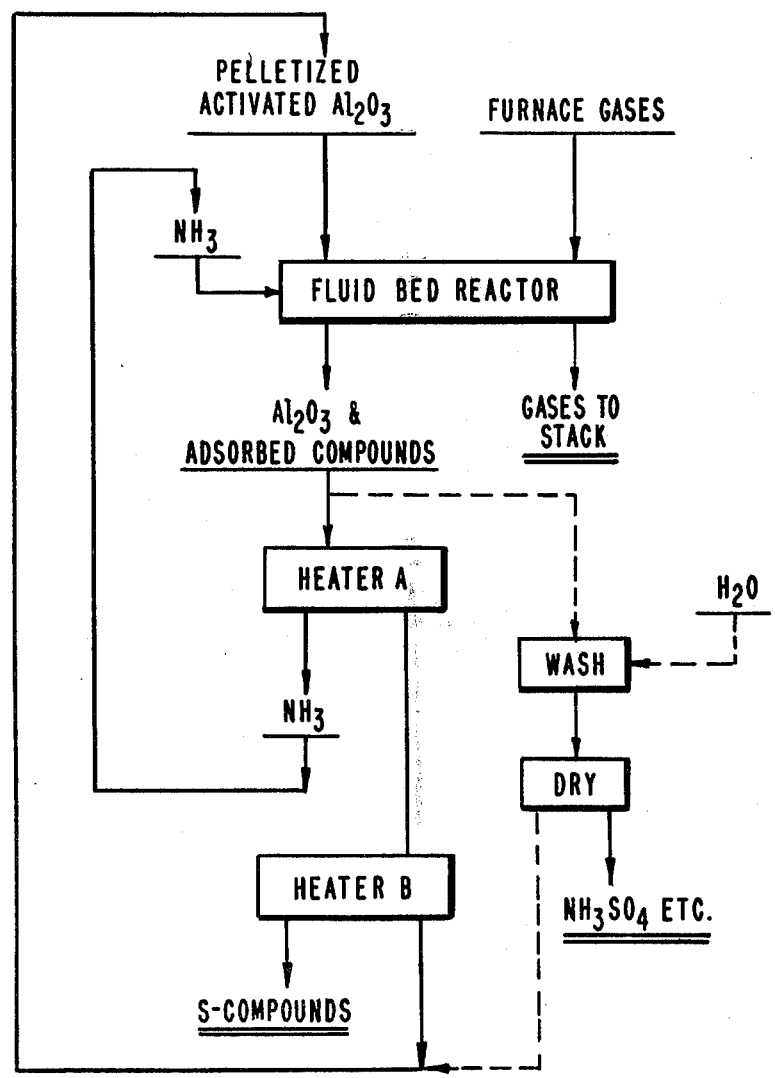
FIG. 4 is a simplified, schematic flow sheet or flow diagram illustrating use of activated alumina recovered from dross in scrubbing sulfurous gases.

As shown in FIG. 4, the activated alumina produced by this process is beneficially employed in sorbing sulfurous gases from the effluent of furnaces with a high degree of efficiency and permitting the sulfurous gases to be recovered in concentrated form as a byproduct. More particularly, in this embodiment it is actually preferred that the alumina contain residual aluminum nitride, because ammonia produced by decomposition thereof is sorbed on the alumina and actually assists in combining with the sulfurous gases. In fact, the process contemplates first sorbing ammonia onto the alumina, or adding ammonia to the sulfurous gases, which are then sorbed together with the ammonia on the activated alumina. In accordance with the invention, upon heating the reacted, activated alumina to regenerate its sorbing power, ammonia is given off at a lower temperature, and is reused in the process, while sulfur dioxide is given off at a higher temperature and in concentrated form, so it may be recovered as a byproduct compressed gas or liquid.

DESCRIPTION OF EMBODIMENTS

The several embodiments of the invention are alike in the method of recoverng the metallic aluminum content of the dross, but differ in the utilization of the activated alumina which has peculiar properties depending on the impurities which are allowed to remain.

Referring again to FIG. 1, it is to be noted that the process differs from the prior art in that the dross is not separated from its metallics by treatment with steam, but is treated with a hot water digestion which is preferably a pressure digestion above 212° F., which has the great advantage not just of decomposing nitrides and carbides, but also of dissolving the halide salts from the dross. These flux salts are then recovered, as by crystallization, from the digestion water and returned to the dross furnacing operation along with any metallic aluminum particles which settle out with the alumina. The flux salts are easily separable therefrom by size and gravity differences.

As shown in FIG. 2, a further washing step, preferably with water counter-current to alumina flow, is needed to remove soluble halide salts which are usually chlorides of potassium, sodium and magnesium, and may include sodium fluioride and sodium aluminate. Then, calcination is necessary, but not at temperatures over 900° C. for any protracted time, but with 600° to 900° C. being permissable. If the activated alumina is spread out on top the cell-grade alumina normally present on the crust of the fused electrolyte before its introduction into the fused electrolyte, the activated alumina will sorb halides from the gas evolving through the crust and gas enclosed under the hood of the cell, thus decreasing the amount of halides to be removed by effluent treating apparatus positioned in the conduits exiting from the hooded cell enclosure. Thus, the activated alumina of the invention lowers the amount of fluoride gas from Hall cells that leaks into a potroom and thence out of the potroom via overhead openings from the potroom to the atmosphere. It does this by decreasing the fluorine concentration under the hoods. FIG. 2 has a simplified representation of a Hall cell to illustrate this, with the hood not shown.

Aluminum reduction plants (potrooms) generally accumulate the molten aluminum tapped from the pot-cells in a holding furnace fired by natural gas or fuel oil, with flames and hit gases directed against the molten aluminum layer and then returning upwards against the reverberatory furnace roof before passing to the stack. The roof radiates heat downward to keep the aluminum molten and heated to temperatures sufficient to melt some scrap, as well as be sufficient for casting sows, pigs, wire or wire bars, or extrusion or rolling billets. Sometimes alloy metals are compounded in these holding furnaces. The oxidation loss of aluminum to alumina ($4Al + 3O_2 \rightarrow 2Al_2O_3$) decreases the aluminum production of the operation by about 1–2%, and increases the alumina needs proportionately. The present invention saves this alumina loss by recovering the alumina from the dross skimmed from crucibles and holding furnaces as activated alumina. It also reduces halide losses from the reduction operation, since it sorbs fluorine much more effectively than cell-grade alumina. The latter is calcined at higher temperatures and, hence, has less sorptive ability.

Figure 1:
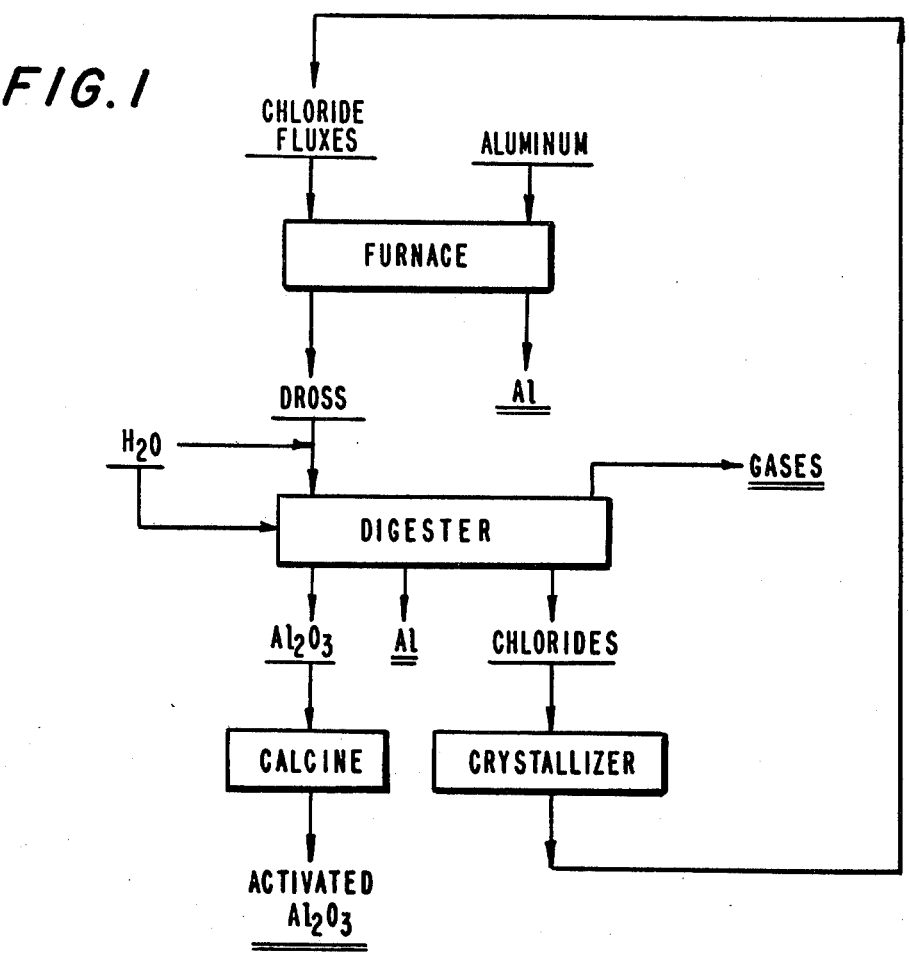
FIG. 1 is a simplified, schematic flow sheet or flow diagram illustrating the recovery of activated alumina from dross in accordance with the present invention.

Referring now to the flowsheet of FIG. 3 for refining aluminum dross to make aluminous pellets suitable for fluxing iron and steel: this embodiment differs from that of FIG. 1 in the degree of digestion and washing of the dross needed to clean it of nitrides, carbides and halide flux salts. Actually, a few percent of flux salts such as halides or fluorides of potassium, sodium or magnesium will be found to be highly advantageous in fluxing steel. Where such salts are absent, calcium chloride should be added to the water used to pelletize the alumina with any of the well-known mineral binders (oxides and silicates of Ca, Mg, etc.), both to make the pellet setup faster and attain early strength and to make the pellet effectively combine with phosphorous precipitating insoluble apatite. Although the mineral apatite has been identified in the petrographic study of slag from steel furnaces, emphasis does not seem to have been made that in rocks chlor-apatite $(CaCl)Ca_4(PO_4)_3$ commonly exists as well as fluor-apatite $(CaF)Ca_4(PO_4)_3$, as clearly shown in *A System of Minearalogy by Dana (Sixth Edition pgs.* 762 to 771). It is believed that the effectiveness of the product of this invention in fluxing steel may be due to the formation at high temperatues of a precipitate of chlor-apatite, or both chlor and fluor-apatite together. The phosphorous so precipitated does not reenter the steel because it freezes to an insoluble compound at high temperatures and flushes out with the main mass of slag which has a lower melting temperature.

While alumina has been used to contribute to a lower melting temperature of blast furnace slags and to steel slags containing some remanent of carry-over slag from the blast furnace, it has not become accepted steel-furnace practice to use alumina up to this time, because fluorspar was cheap, and the air pollution of fluorides was not curbed in all localities. The activated alumina of this invention, when added to steel slags, sorbs both fluorides and chlorides into the alumina, which releases them to the body of the slag as a component of apatite by which phosphorous is precipitated in the slag so it cannot reenter the steel. The alumina added in this form to the high-lime slags needed to reduce phosphorous and sulfur content of steels also serves to avoid loss of lime (calcium) by exothermically reacting with it, thus by avoiding the precipitation of dicalcium silicate. Conventionally, whatever lime precipitates as di-calcium silicate (which melts above 2000° C.) is obviously lost in providing alkalinity to molten slags used in the steel making process at temperatures of 1400° to 1600° C. The activated alumina of this invention may sorb or chemically combine with chlorine or chlorides (such as HCl) or fluorine or fluorides (such as HF) evolved from the steel making process so that it is unnecessary in all cases for some halide salts to be carriedover from the dross refining operation. This is particularly the case where some fluorspar is used in the slag. In this case the activated alumina of this invention reduces the amount of flurospar needed by sorbing or rapidly reacting with fluorides which are evolved or tend to be evolved from the slag during its formation.

It is often advantageous to mix oxides or carbonates of Mg, Fe, Mn or Si in amounts of a few percent or less with the activated alumina to flux steel, though these elements are ordinarily added to the steel separately.

In both embodiments discussed above, most of the alumina metallics are recovered from the dross in the rotary or reverberatory holding furnace, and the remainder is recovered in the digestion step. In both cases the alumina is recovered from the dross in activated form and is used to sorb or react with a halide in the furnacing operation to which it is thereafter fed (aluminum fused-salt electrolysis or steel making). In both cases the alumina lowers the melting temperature of the fused flux so a purified metal (aluminum or steel) is produced in the furnacing process.

FIG. 4 illustrates the embodiment of the invention relating to the recovery of sulfurous compounds from furnace effluent gases. The first steps to this process are the same as previously described, wherein activated alumina is produced from dross. However, for sorbing sulfurous gases from effluent from furnaces such as those used by public utility companies burning fossil fuels, it is desirable that the activated alumina particles be in the form of larger pellets ($\frac{1}{4}$ to 1 inch in diameter) so these can be suspended or supported in high velocity gas streams at velocities of 2 to 20 feet per second, and preferably in a dispersed phase condition. Such high velocities enable the apparatus to be smaller and cheaper to construct. While particles of any size will react chemically in the desired manner, it is difficult to keep small particles in the reactor, and handling, recycling and dust-loss problems result. Thus, as used herein, both "particles" and "pellets" are intended to mean particulates of adequate size to avoid such problems where they can occur.

Ammonia gas is either reacted first with the alumina or is added to the furnace gases so as to turbulently mix therewith prior to contacting the alumina pellets. Under these conditions, with the pellets at 125° to 200° C., the pellets tend to sorb the sulfurous compounds. It is not known whether the sulfur is present within the alumina at these temperatures as a gas or as a solid, but when the pellets are cooled to room temperature ammonium sulfates or other sulfurous salts of ammonia can be leached out in a novel step and the pellets reactivated. This embodiment is shown in phantom in FIG. 4. Preferably, however, the pellets of alumina are heated first to 250° to 400° C. to desorb ammonia gas, and are then subsequently heated to 350° to 750° C. to desorb sulfurous compounds such as $SO_2$. As this can be recovered in concentrated form, it can be sold as a byproduct in gaseous or liquified form. However, the recovered ammonia gas from desorption is reused in the process. The great advantage of this novel process compared to other conventional processes is that the removal of sulfur from the effluent furnace gases is very capable when ammonia is used and both the ammonia and the sulfur are recovered on the activated alumina pellets but may be separately recovered therefrom as the alumina is reactivated. Both alumina and ammonia may be used over and over again in the process with only make-up losses being supplied.

The activated alumina needs to be most pure when it is to be used for the electrolytic reduction of aluminum (FIG. 2), where traces of potassium or chlorides or aluminum nitride are harmful to Hall cell operation. Potassium tends to heave the carbon cathode, and aluminum nitride tends to electrically insulate the cathode, increasing resistance to current passage therethrough. Chlorides in the fluoride both may cause poisonous phosgene gas to be evolved, particularly at the time of anode effect, when men may be needed to attend the working of the potcell crust.

A few percent of a halide in the activated alumina will often be found advantageous when the alumina is to be used for additions to steel-making slags, since the element chlorine as well as fluorine is a common component of the mineral apatite which freezes out of steel-making slags as an insoluble precipitate at high temperatures, carrying phosphorous out of solution in the slag so it cannot, therefore, redissolve in the steel bath underlying the slag and continue to contaminate the steel with an unwanted impurity. As noted above, if enough chlorides are not present in the activated alumina from the dross digestion step in hot water, it is preferred that calcium chloride be added to the mineral binders used in pelletizing the activated alumina. Depending on the type of steel-making process involved, other slag-making ingredients sometimes need to be incorporated in the alumina pellets. This is particularly the case for fast, oxygen-based steel refining processes, where carbon is removed from iron to make steel in a matter of minutes rather than hours and slags must form quickly to accomplish their purpose of removing sulfur and phosphorous from the steel along with the carbon. It is also helpful if the alumina has retained in it some of the fine aluminum metal particles contained in the dross, since these produce a thermit reaction with the iron and manganese oxides which increases steel output and raises the slag temperature momentarily, to enter the alumina and mineralizers therein. Of course, aluminum-killed steels are well known.

A talc-apitite, distinguished by about 20% of the calcium oxide content of apatite being replaced by magnesium oxide, contains 2.0% or more of sulfur oxide ($SO_3$); in the practice of this invention the substitution of part of the lime or limestone added with dolomite is advocated. This removes sulfur from steel by forming a talc-apatite containing both sulfur and phosphorous.

Washing the activated alumina recovered by digesting dross in water adds to the expense of recovery, as does long periods of digestion or pressure digestion above boiling temperature, but such practice is not only not necessary but is usually undesirable when the recovered activated alumina is used for fluxing steel furnaces.

In the third embodiment of the invention, as illustrated in FIG. 4, long digestion of the dross to remove nitrides is not needed or desirable, as the nitrides in decomposing give off ammonia which is actually needed in the process. However, flux salts of the dross should be washed out after digestion to quantities of a few percent or less, since only trace amounts in the alumina are belived necessary to provide any needed power for sorption of sulfur when ammonia is present (as by addition) in the effluent furnace gases being treated for sulfur removal.

In the embodiments of either FIGS. 3 or 4, pebbles or pellets of activated alumina are more suitable than alumina powder, to allow for the easy withdrawal from bins and to reduce dust losses. The pebbles may be formed by compacting alumina particles at high pressues, or by addition of about 5–30% of a mineral binder in a pelletizing machine, as is conventionally known.

Understanding of the invention will be facilitated by referring to the following specific examples thereof, which are to be interpreted only as illustrative and not in a limiting sense.

EXAMPLE I

Reverberatory furnaces for melting aluminum scrap and a holding furnace receiving molten aluminum from the tapping of Hall-type aluminum reduction cells were skimmed, to produce dross batches containing 8% to 80% aluminum metal.

These batches of dross were fluxed in conventional rotary of reverberatory furnaces consisting principally of about equal weights of sodium chloride and potassium chloride plus whatever fluorides were present in the batches of dross received. From time to time, aluminum was withdrawn from a layer of it beneath the heavy flux layer. Also from time to time, the flux layer was withdrawn, depleted of its aluminum content and enriched in its alumina content by the dross. The NaCL-KCl flux layer was likewise replenished from time to time before fresh dross was added.

The batches of dross, with or without the above described flux-furnacing to reduce aluminum content, were treated with hot water to disintegrate and slurry the mass, and release aluminum particles, alumina particles, insoluble fluxes and impurites and to dissolve soluble fluxes, mainly NaCl and KCl. Aluminum particles were then classified out. To complete the disintegration and separation, and particularly to decompose the nirides and carbides in the dross, a continuous pressure digestion is performed on the slurry in a vertical cylindrical digestor. The digestion continues for about six hours at about 250° C. during which hydrocarbon gas and ammonia are bled off from the top, with some steam as the carbide and nitride impurities decomposed. As the digested slurry comes out of the digestor it is classified into the three products shown below together with the original digestor feed. All the aluminum recovered prior, during and after digestion is included in the metallic aluminum product.

TABLE I
APPROXIMATE ANALYSES OF FEED TO AND PRODUCTS FROM DIGESTION OF DROSS (dry basis)

| MATERIAL PRESENT | DROSS FED DIGESTOR | METALLIC ALUMINUM PRODUCT | ALUMINA PRODUCT | FLUX SOLUTION PRODUCT |
| --- | --- | --- | --- | --- |
| aluminum particles | 8%–80% | 70%–90% | 5%–15% | 0.1–2% |
| alumina particles | 80%–10% | 20%– 5% | 65%–90% | 3%–10% |
| soluble flux (NaCl and KCl) | 30%–70% | 10%– 5% | 2%–15% | 85%–95% |
| carbide & nitride ($Al_4C$ & $Al_2N_2$) | 3%–8% | 0.0–0.1% | 0.1–0.5% | 0.0–0.1% |
| insoluble flux etc (cryolite, calcium fluoride, carbon) | 1%–6% | 1%–3% | 0.5%–10% | 0.1–1.0% |

The aluminum product was used for "killing" steel to reduce oxygen content. The alumina product was used for fluxing electric steel furnaces. The flux solution product was cooled to crystallize contained NaCl and KCl as the solution became more concentrated due to evaporation. The crystallized chlorides were dried and added to the flux furnaces and the desalted solution was reused to digest additional batches of dross. Steam recovered from cooling the digested solution is used to preheat the solution after desalting and prior to digestion, as well as during digestion.

EXAMPLE II

Alumina produce of (Table I) is washed in countercurrent classifiers until the chloride flux content is less than 1%. The recovered alumina is calcined at about 700° C. to produce an activated alumina which is reacted with the air enclosed beneath the hoods of Hall reduction cells to reduce the fluoride content thereof. The reaction vessel is a cone-shaped cyclone on the periphery of which a small electric blower introduces air tangentially near the cone top as well as at the cone base to keep the alumina particles in suspension but retard particle loss through the outlet of the cyclone due to centrifugal effect. The air under each cell hood is thus recirculated through the activated alumina particles which sorb gaseous fluorides therefrom and entrained solid fluoride particles in the activated alumina to reduce the total fluorides in the air under each hood by from 20% to 80%. From time to time the activated alumina is removed from the cyclone and added directly to the molten cryolite fusion, together with cell-grade alumina to reduce dust losses of the activated alumina which contain the sorbed fluorides. Fine particles of activated alumina blown out of the cyclone settle on the cell-grade alumina on the potcell crust and are ultimately fed into the molten cryolite.

Only about 1 to 2% of the alumina requirements of each cell are fed to the cell as activated alumina, which corresponds to the amount of alumina resulting from the oxidation of molten alumina during tapping and holding prior to casting, and which this process recovers by treatment of dross skimmed from potroom crucibles and holding furnaces.

The process of this invention, by removing fluorides under the hood of a cell, greatly decreased the amount of fluoride removal equipment conventionally needed to treat gases removed through ducts attached to each cell hood, and also equipment needed to treat air vented from the potroom roof louvers.

EXAMPLE III

Alumina (Table 1) was prepared for fluxing an electric furnace for making steel ingots from steel scrap. The alumina was dried and mixed with about 20% of a mixture of lime-bearing and clay-bearing binders and 1% of iron oxide, and then is pelletized on a rotating pan-type pelletizer to make pellets in the size range of ¼ to ½ inch in diameter, which are easy to handle.

The alumina content of the pellets combined with the unreacted lime in the slag, with the result that dicalcium silicate did not form to waste the lime and make the slag viscous.

Lime and the chlorides in the alumina combined with the phosphorous in the slag and steel to precipitate artificial chlor-apatite. Magnesium in the slag from the use of dolomitic limestone formed artificial talc-chlor-apatite, with a content of about 2% sulfur, thereby removing sulfur from the slag and steel as well as phosphorous.

Aluminum content of the alumina product reduced iron and manganese content of the slag back into the steel, thus increasing the steel production and lessening losses of these elements in the slag, which is otherwise wasted. The aluminum reaction with the iron and manganese in the slag likewise produced heat and kept the slag liquid and reactive, while it was removing sulfur and phosphorous from the steel. By making the slag reducing in character during this period it reduced the "boil" resulting from carbon in the steel reacting with iron oxide in the slag.

About twenty pounds of this alumina product per ton of steel made were added for fluxing the slag, and it is believed that it could be used to replace half or mor of the fluorspar normally used for fluxing.

EXAMPLE IV

An activated alumina prepared as in Example I was calcined for activation at a temperature of about 750° C. Relatively coarse particles (+150 Tyler mesh) were screened out to use in the sorption of sulfur compounds from a furnace fired with a high-sulfur gas. The stack gases from this furnace were directed through a cone-shaped reactor in which the alumina particles were kept suspended by the stack gases entering the base of the cone. Fine alumina particles leaving the top of the cone were recovered and recirculated back to the bottom of the cone by means of cyclone dust collectors.

Sufficient ammonia gas was bled to and turbulently mixed with the stack gases prior to their entering the reaction cone so that the sulfur dioxide present was converted (theoretically) to ammonium sulfate, with excess oxygen and water vapor normally present in stack gas.

A portion of the alumina in the reactor circuit was continuously bled off and heated above the stack gas temperature of 125°–200° C., first to 250°–400° C. to desorb ammonia as a gas, which was continuously refed into the effluent of the furnace to recombine with sulfur oxides therein. The alumina was then heated to 400°–750° C., whereby sorbed sulfur dioxide was driven off and cooled and compressed to a liquid for sale as liquid sulfur dioxide.

In one test of this process, the activated alumina was saturated with ammonia gas prior to contact with sulfur dioxide vapor. Upon contact with the sulfur dioxide, it sorbed 10.10% of $SO_2$ per weight of alumina. Upon leaching this activated alumina with water and again drying it, it was found to have sorbed a total of 21.14% of its weight, which corresponds closely with the 20.81% theoretically sorbed if all the sulfur dioxide converted to ammonium sulfate $(NH_4)_2SO_4$.

Where ammonium sulfate is produced, it can be sold as fertilizer, but the preferred method is to recycle the ammonia (recovered from the activated alumina by heating) and add more ammonia gas and activated alumina only as needed for make-up losses in the process.

Various changes in the details, steps, materials and arrangements of parts, which have been herein described and illustrated in order to explain the nature of the invention, may be made by those skilled in the art within the principle and scope of the invention as defined in the appended claims and their equivalents.

What is claimed is:

1. The process for sorbing sulfor compounds from hot gases on activated alumina produced from dross containing aluminum particles, alumina and impurities comprising:
   charging said dross onto a layer of molten halides underlain by a layer of molten aluminum in a holding fernace, whereby a portion of the aluminum entrained within the dross enters the aluminum layer and the alumina and impurities are entrained in the halide flux layer;
   separating said dross from said molten aluminum;
   digesting said dross with hot water to at least partially dissolve soluble impurities and decompose insoluble impurities;
   separating remaining aluminum particles and the purified alumina from said water as separate fractions; and
   drying said alumina to produce an activated alumina,
   pelletizing said activated alumina; and
   sorbing sulfur oxides from hot gases onto the pellets so formed.

2. The process as claimed in claim 1, and additionally comprising adding ammonia to said gases prior to said sorbing step, said ammonia being sorbed onto said pellets.

3. The process as claimed in claim 1, and additionally comprising:
   de-sorbing sulfur oxides from said pellets by heating same to a higher temperature;
   recycling said de-sorbed pellets to said sorbing step; and recovering said sulfur oxides.

4. The process as claimed in claim 2, and additionally comprising:
   heating said sorbed pellets to a temperature sufficient to de-sorb ammonia;
   recycling said ammonia to said sorbing step;
   further heating said pellets to a temperature sufficient to de-sorb said sulfur oxides;
   recycling said de-sorbed pellets to said sorbing step; and
   recovering said sulfur oxides.

5. The process as claimed in claim 4, wherein said first heating is within the range of 250° to 400° C. and said further heating is within the range of 400° to 750° C.

6. The process as claimed in claim 2, wherein said gases are at a temperature in the range of 125° to 200° C.

7. The process as claimed in claim 2, and additionally comprising:
   washing sorbed pellets with water;
   recovering ammonium-sulfur compounds from said water; and
   drying and recycling said pellets to said sorbing step.

8. The process of sorbing sulfur oxides from hot gases comprising:
   mixing said gases with gaseous ammonia;
   contacting said gases with pellets comprising principally activated alumina;
   periodically removing said pellets;
   heating said pellets to a first temperature sufficient to desorb ammonia;
   further heating said pellets to a second, higher temperature to desorb sulfur oxides; and
   returning the pellets to said contacting step.

9. The process as claimed in claim 8, wherein said contacting step is carried out in a fluid bed reactor.

10. The process as claimed in claim 8, and further comprising:
    employing the temperature range of 250° to 400° C. to de-sorb ammonia;
    recycling said ammonia to said mixing step after said first heating;
    employing the temperature range of 400° to 750° C. to de-sorb sulfur oxides; and
    recovering said sulfur oxides after said further heating.

11. The process as claimed in claim 10, wherein said activated alumina is produced from dross containing aluminum particles, alumina and impurities by the steps of:
    charging said dross onto a layer of molten halides underlain by a layer of molten aluminum, whereby most of the aluminum entrained within the dross enters the aluminum layer and the alumina and impurities are entrained in the halide flux layer;
    separating said dross from said molten aluminum;
    digesting said dross with hot water to at least partially dissolve soluble impurities and decompose insoluble impurities;
    separating remaining aluminum particles and the purified alumina from said water as separate fractions; and
    drying said alumina under conditions controlled to produce an activated alumina; and
    forming said activated alumina into pellets with Portland Cement as a binder.

12. The process of sorbing sulfur oxides from hot gases at temperatures between 125° and 200° C. comprising:
    saturating activated alumina with ammonia gas;
    contacting said alumina with said hot gases;
    periodically removing at least a portion of said alumina particles and heating them to temperatures between 200° and 400° C. to desorb said ammonia; and
    thereafter further heating the alumina particles to temperatures between 400° and 750° C. to desorb sulfur oxides and recover same.

13. The process as claimed in claim 12, wherein a portion of the ammonia sorbed on the activated alumina prior to contact with the hot gases is derived from the decomposition of nitride impurities present in the activated alumina.

14. The process of sorbing sulfur oxides from hot gases at temperatures between 125° and 200° C. comprising:

saturating activated alumina particles with ammonia gas;

contacting said alumina particles with said hot gases;

periodically removing at least a portion of said alumina particles; and leaching ammonia-sulfur salts from said particles with water.

* * * * *